United States Patent [19]

Haddon

[11] 4,106,806
[45] Aug. 15, 1978

[54] WINDSPLITTER TRUCK STABILIZER

[76] Inventor: Frank M. Haddon, P.O. Box 2135, Downey, Calif. 90242

[21] Appl. No.: 726,237

[22] Filed: Feb. 28, 1977

[51] Int. Cl.² .............................................. B60P 3/32
[52] U.S. Cl. .............................. 296/23 MC; 296/1 S
[58] Field of Search ................ 296/23 MC, 23 R, 1 S, 296/91

[56] References Cited

U.S. PATENT DOCUMENTS

| | | | |
|---|---|---|---|
| 3,695,673 | 10/1972 | Meadows | 296/1 S |
| 3,729,224 | 4/1973 | Hathaway | 296/23 MC |
| 3,767,252 | 10/1973 | Hathaway | 296/23 MC |
| 3,797,879 | 3/1974 | Edwards | 296/1 S |

Primary Examiner—Philip Goodman
Attorney, Agent, or Firm—Ronald L. Juniper

[57] ABSTRACT

A resilient material molded into a triangular form to go between a pickup truck cab roof and a mated camper cab-over to solidify and eliminate the sway of the pickup. It also diverts wind each way out from the side of the truck, thus eliminating the wind lift of the camper, leaving full normal weight of the pickup on the front wheels and preserving full control of the pickup truck.

4 Claims, 5 Drawing Figures

WINDSPLITTER TRUCK STABILIZER

BACKGROUND OF THE INVENTION

Prior to this invention there had been a substantial problem with the stability of pickup trucks having cab-over campers, particularly in severe crosswinds. This was, in part, because of the gap between the cab top of the pickup and the overhang of the camper. At times the overhang may tend to act like the wing surface of an airplane, thus causing significant handling problems.

Previous attempts to solve these and related problems had not been satisfactorily achieved.

Accordingly, this invention incorporates a unique structure which alleviates the aerodynamic problems of the camper pickup thereby achieving increased stability, handling, economy and efficiency.

SUMMARY

An example of this invention includes a triangle of molded rubber composition with a triangle of strap iron molded therein. The top, of the strap iron is so made that it can bolt the attached rubber to the bottom of the overhang of the cabover camper to be attached to a pickup truck. This triangle is positioned to split wind caused by the forward motion of the pickup truck. It is of such thickness as is needed to fill the space between the pickup cab and the hangover of the cab. It's thickness is sufficiently enough greater than the space between the pickup roof and cabover, when installed, that it will compress tightly thus solidifying the truck and camper to stabilize all swaying. This results in diverted windflow causing loss of wing effect of the camper cabover leaving all weight on the wheels of the pickup and no loss of control, more gasoline mileage and more security as a safety device.

DESCRIPTION OF A PREFERRED EMBODIMENT OF THE INVENTION

Figure 1:
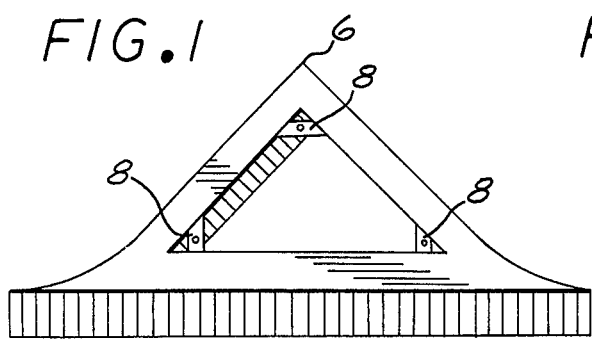
FIG. 1 is a top isometric view of a rubber molded structure in accordance with this invention.
Figure 4:
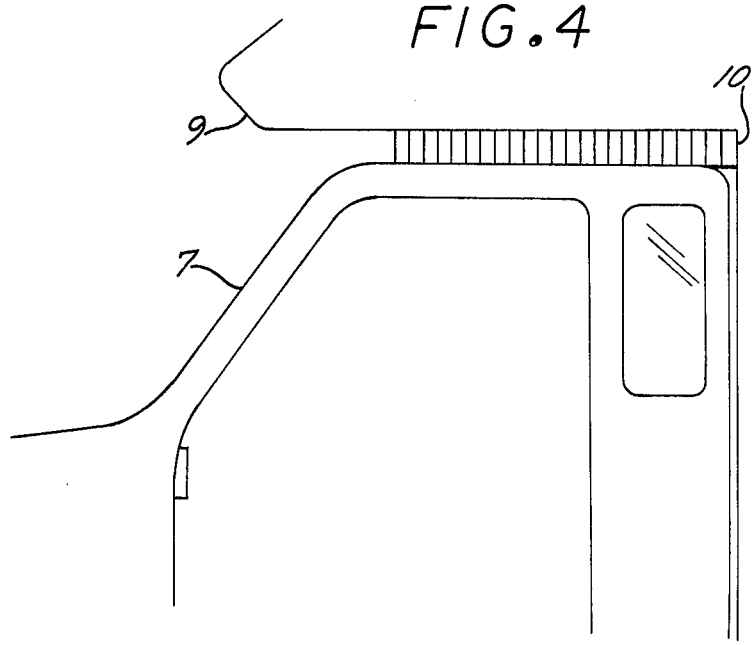
FIG. 4 is a side elevational view of a truck cab and the portion of a camper overhanging it with a windsplitter in accordance with this invention in operative position in the space between them.
Figure 5:
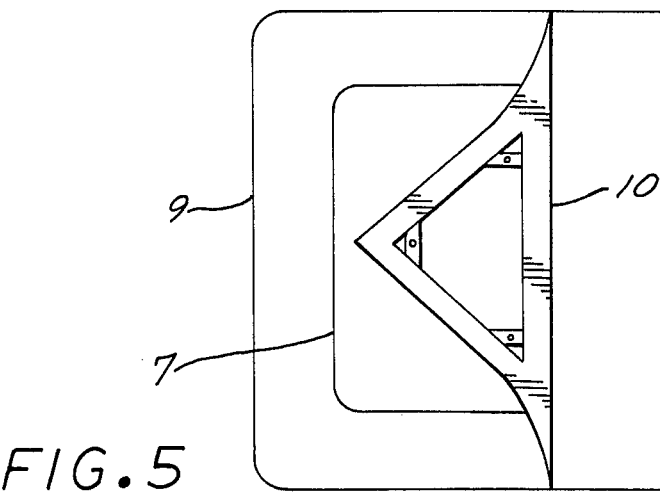
FIG. 5 is a top view showing the relative location of the windsplitter device herein when in position between the truck cab and camper overhang.

The basic structure of this invention is best shown in FIG. 1 as a molded triangle of a composition of the rubber family. The sides and back wall are four inches thick with the side walls curving outwardly to extend three inches beyond the straight line of the sides thereby making the back longer than the sides. This triangle is to be positioned over a pickup cab 7 having an attached camper as shown in FIGS. 4 and 5.

Figure 2:
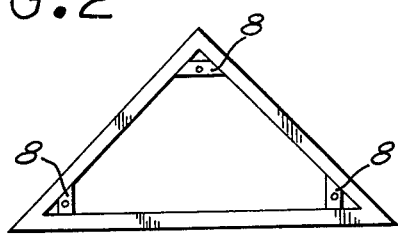
FIG. 2 is a top plan view of the metal holding bracket used as the strap iron molded into the wind splitter structure in FIG. 1.
Figure 3:
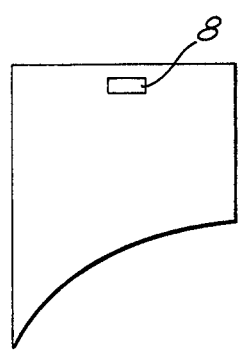
FIG. 3 is a view as taken in section through the structure of FIG. 1 showing a curved bottom edge conforming to the cab roof against which it compresses.

As shown best in FIG. 2 a strap iron ⅛ inch thick and ⅝ inch wide is made in triangular form to conform with the triangle in FIG. 1, but of somewhat smaller size. This strap iron has welded corners with exposed cross-pieces 8 welded in each corner. There is a ¼ inch hole in the center of each cross-piece 8. This strap iron is to be molded into the triangular composition shown in FIG. 1, ½ inch down from the top leaving cross-pieces 8 exposed to bolt the device to the underside of a camper cabover 9 so it can be positioned over a pickup cab 7 as shown in FIG. 4.

In use the triangle as in FIG. 1 is pressed back firmly to the corner 10 formed by the camper cabover 9 and its main shell. Its molded in strap iron as in FIG. 2 is bolted up to the cabover 9 to hold the assembled windsplitter device in place. Preferably the nose 5 of the triangle points forward on top of the center of cab 7 five inches back of the front of cab 7. This arrangement, when mounted on cabover 9, gives a triangle to split wind current made by forward motion of cab 7. The wind is directed by preselected positioning of the triangle to flow away from cabover 9 thus minimizing aerodynamic lifting effect thereof and leaving the pickup with its full weight on its front wheels for fuller control and less drag with cosequently greater mileage.

The height of the side walls of the triangle as shown in FIG. 1 is always preferably three inches more than the distance between the pickup cab 7 and camper cabover 9. For example there may be three different heights of these side walls, namely three inches, six inches or nine inches as needed to solidify and eliminate the sway of a camper pickup. Also, the triangle is conventionally molded in three different widths for narrow, small cabs, for medium cabs and for large, wide cabs, each staying about one inch inside of the edges of the pickup cab sides.

As best shown in FIGS. 1 and 5 the basic triangular shape of the windsplitter is preferably modified so that the sides thereof which form the apex of the triangle are concavely curved outwardly. This is intended to provide a very unique airflow characteristic smoothly deflecting received wind outwardly thereby minimizing turbulant air buffeting.

Though a particular form of this development has been shown and described herein this is not meant as a limitation of this invention, but as an exemplification which is intended to be further comprehended by the spirit of the following claims.

What is claimed is:

1. A windsplitter truck stabilizer for use with a truck which includes a cab with a pick-up body and a camper carried in said pick-up body which has a forward portion which overhangs the roof of said cab but leaves a space between said camper overhanging portion and said cab roof: wherein said stabilizer is essentially triangular and fills the space between said overhanging camper portion and said cab roof and where said stabilizer is substantially positioned secured to said camper overhang so that an apex of its triangular shape is centered on said camper overhang and pointed forward with the two sides forming said apex sloping outwardly and back about equally toward the outer edges of said camper.

2. A windsplitter as defined in claim 1 which is comprised of a resilient material of sufficient thickness to press tightly between said camper overhang and said cab roof.

3. A windsplitter as defined in claim 1 which has a holding bracket that functions to secure said stabilizer to said camper overhang.

4. A windsplitter as defined in claim 1 wherein said sides forming the apex of the triangular shape concavely curve outwardly therefrom.

* * * * *